United States Patent Office 3,037,736
Patented June 5, 1962

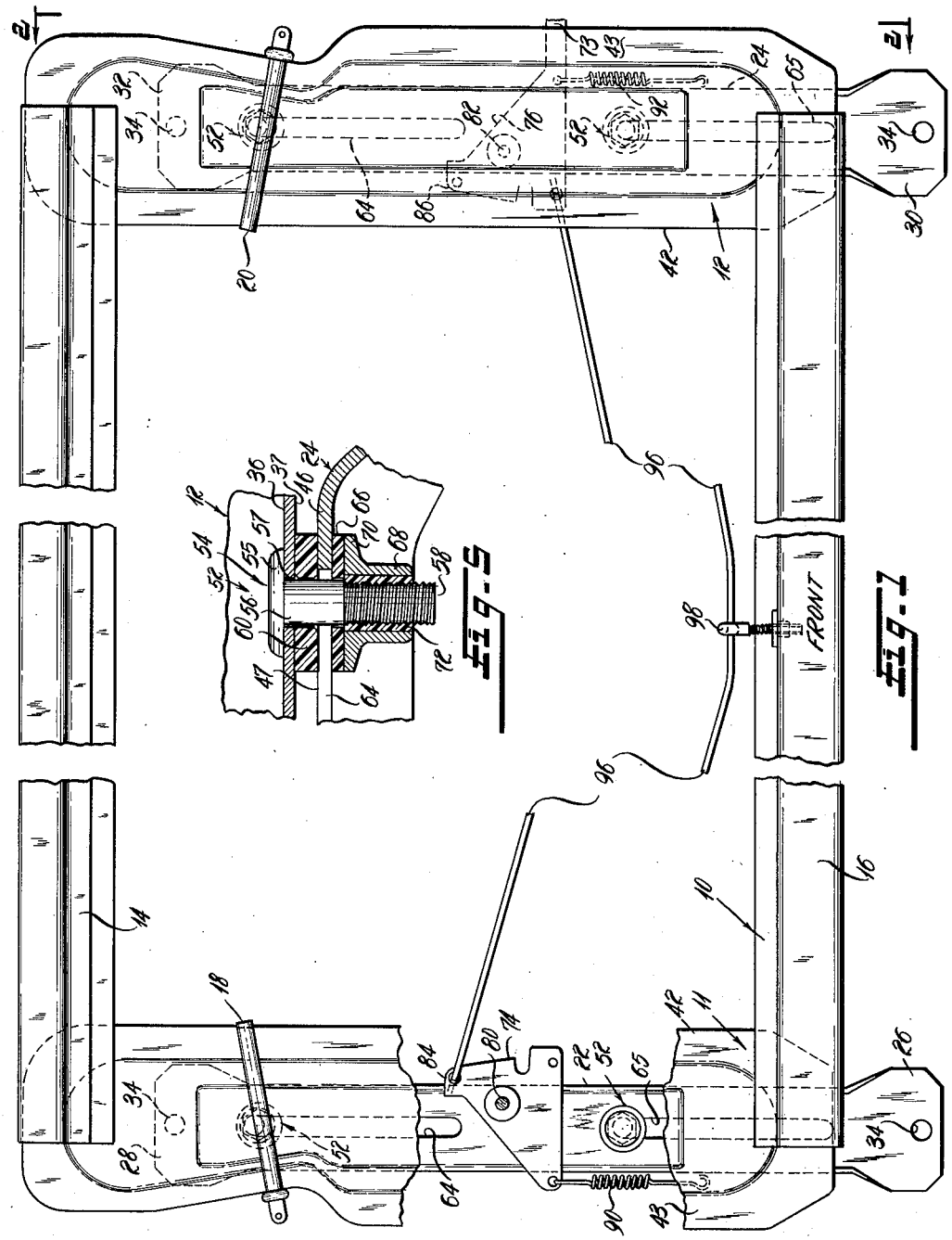

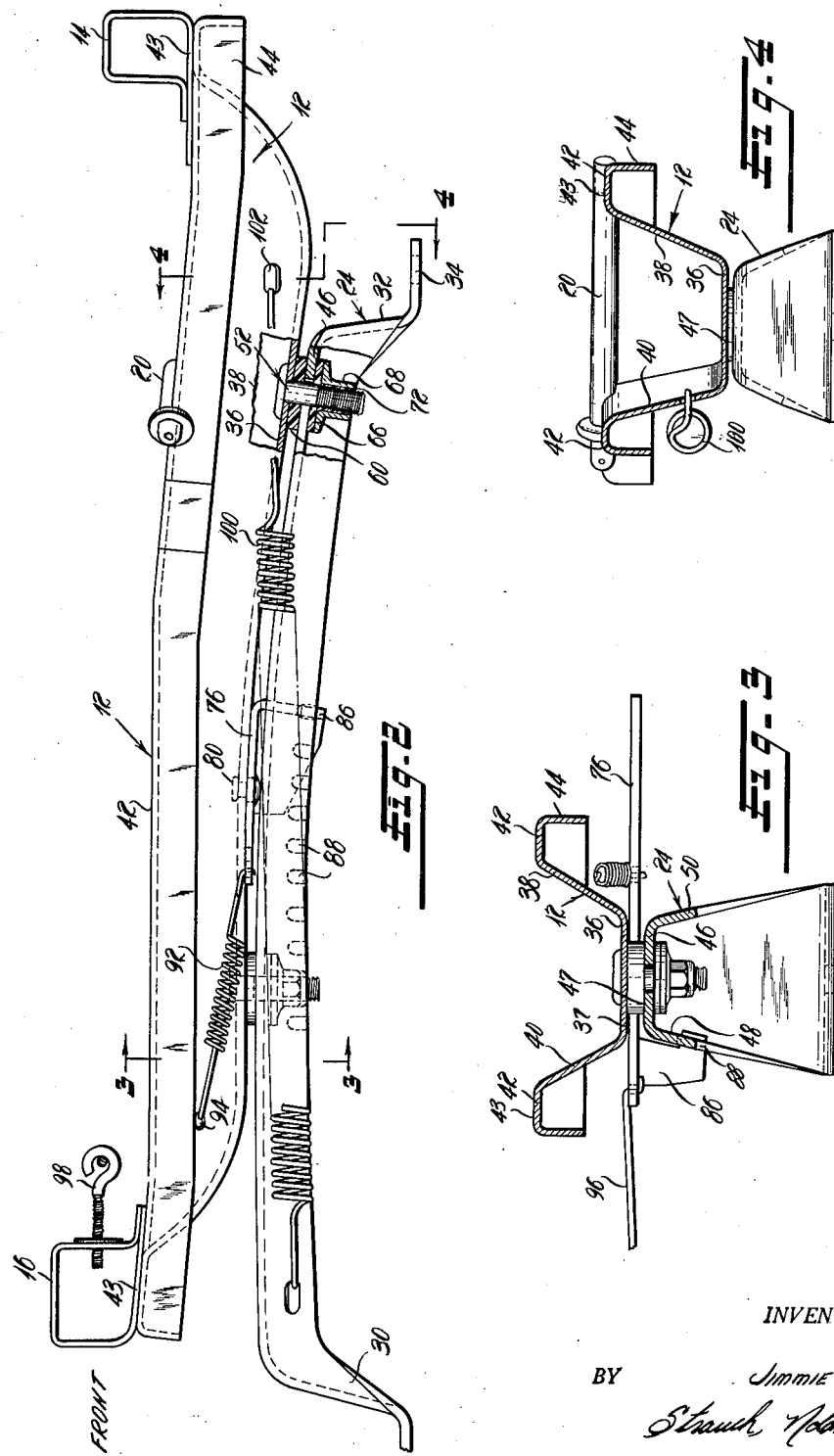

3,037,736
SEAT ADJUSTMENT
Jimmie James, Madison Heights, Mich., assignor to Rockwell-Standard Corporation, Coraopolis, Pa., a corporation of Pennsylvania
Filed Sept. 18, 1959, Ser. No. 840,972
6 Claims. (Cl. 248—429)

The present invention refers to an improvement in seat mounting and more particularly to a vehicle seat support with special slide construction.

It has become conventional practice to mount either the front or rear seats or both of an automotive vehicle for sliding movement longitudinally of the vehicle to adjust the seat position to suit the physical requirements of the occupants of the vehicle.

The most widely used current practice in adjustable automotive seat construction is to provide a slide track assembly employing antifriction means (such as balls or rollers) between opposed raceways fastened underneath the seat, and the complete assembly then being mounted on the automobile floor. Adjusting and locking means, such as notched racks and latches, screw rods, etc., are provided to accomplish sliding adjustment and locking in any desired position.

During normal use of those conventional antifriction sliding seat adjustment constructions such stresses and strains are placed upon the seat components as to produce after a time a noisy and hard to operate sliding seat assembly. Also very often the several parts, which make up the seat assembly, become misaligned due to unequal weight distribution during actual seat adjustment thereby resulting in cocking and jamming of the slide structure. Other disadvantages of the conventional sliding seat assemblies are that they usually consist of an uncertain number of pieces which have to be assembled in the auto plants, first the upper track members being fastened underneath the seat frame, secondly the lower track member and support being bolted to the vehicle floor, and third the whole assembly being put together in proper position. This multiple part construction is a rather time-consuming and expensive assembly process. Disturbing noise in the sliding assembly due to the metal-to-metal contact between the bearing members and raceways constitute another important disadvantage of conventional sliding seats.

It is a desirable practical aspect that the seat track assemblies be relatively inexpensive to manufacture and easy to assemble without sacrificing any of the requisite necessities required in sliding seats of today. In making the new improved and less expensive sliding seat assembly of the invention it was sought to attain a smoother and quieter operation. With these points in mind, the present invention provides an improved, inexpensive sliding seat which consist of but few parts readily assembled and put together by the seat manufacturer. Noise in the assembly is almost entirely eliminated due to the use of plastic bearings. Separate raceways have been eliminated, the plastic bearings sliding along the upper surface of the support. There are practically but three components in this new improved sliding seat which are: the seat frame, the support providing an integral track, and the plastic bearings between the seat frame and support, which first holds the assembly together and secondly provides a sliding bearing for adjustment.

Accordingly, it is an object of the present invention to provide an improved and simplified sliding seat assembly a novel lower support constituting an integral raceway and a sliding seat frame assembled thereto as by means of a screw, nut, and plastic bearing assembly, which also provides the sliding means for the seat frame.

It is a further object of the present invention to provide an inexpensive simple sliding seat construction which is readily assembled apart from the vehicle and needs only to be bolted down to the vehicle floor in the vehicle assembly plant.

Another object of the present invention resides in the provision of novel plastic bearing arrangements and parts for sliding seat assemblies which substantially completely eliminate noise during operation.

Still another object of the present invention is the provision of an improved sliding seat construction which is substantially completely vibration and rattle free and in which no misalignment, cocking or jamming occurs.

A still further object of the present invention is to provide a novel sliding seat construction which provides a substantial saving in weight due to its few components and unique simplicity.

Other objects and features of the present invention will become apparent from the following description and claims in connection with the accompanying drawings in which:

FIGURE 1 is a top plan view of the seat slide frame with part of one of the side frame members being removed for clarity and to show the structure beneath it;

FIGURE 2 is an enlarged side elevation of the slide frame of FIGURE 1 looking along line 2—2 of FIGURE 1 with the rear bearing part shown in cross section;

FIGURE 3 is a section along line 3—3 in FIGURE 2 through the side frame member and support;

FIGURE 4 is a section along line 4—4 in FIGURE 2 through the same side frame member; and FIGURE 5 is an enlarged separate cross section through the bearing part of FIGURE 2 showing more detail.

With reference first to FIGURE 1 a rectangular seat frame 10 has similar side frame members 11 and 12. Side frame members 11 and 12 are rigidly interconnected at both their front and rear ends. A channel shaped sheet metal crossrail 14 connects their rear ends and a similar crossrail 16 connects their front ends. These rails are welded on top of the side frame members 11 and 12, to provide a substantially rectangular rigid integral construction.

Connecting rods or bolts 18 and 20 which are welded across side members 11 and 12 near the rear provide a rigid means for attaching the usual back rest (not shown). The entire integral seat frame 10 is slidably supported on longitudinally parallel rigid bridge-like side support beams 22 and 24 which have front legs 26 and 30 and rear legs 28 and 32 provided with holes 34 to bolt them to the vehicle floor. Support beams 22 and 24 are substantially identical in every respect and they similarly support frame 10. Each of beams 22 and 24 is preferably an inverted steel channel beam suitably formed at its ends to provide the depending legs.

Referring to FIGURES 3 and 4, side frame member 12 is trough-like with the open side up and has a flat base 36 from which the side walls 38 and 40 extend oppositely angularly upwards to terminate in flat parallel rim sections 42 at the same level. The bottom surface of base 36 is a transversely flat raceway surface 37. Rim sections 42 extend entirely around the upper part of member 12, and side frame 11 is similarly formed, so that two large area surfaces 43 at the same level are provided on each side. As shown in FIGURE 2 rails 14 and 16 and the backrest mounts 18 and 20 rest upon and are welded to surfaces 43. Skirt 44 extends all around rims 42 and may be used to connect the seat cushion trim.

Side frame member 12 is placed upon and slidingly secured to support beam 24 beneath it. Beam 24 has a slightly longitudinally rearwardly and downwardly curved base 46 providing an integral raceway surface 47 which is smoothly curved from front to rear and flat from side to side, and beam 22 provides such a surface 47 parallel thereto and on the other side. Sloping outwardly and downwardly from the opposite side edges of beam 24 are integral side walls 48 and 50 to provide an inverted trough structure which terminates at both ends of the support together with the base 46 by merging into the integral legs 30 and 32. Beam 22 is similar.

The side frame members and beams are all preferably integrally formed members fabricated from heavy stock and of substantial uniform cross section so as to be able to support the load being placed upon them without material deflection.

A slide bearing, generally indicated at 52 and shown enlarged in FIGURE 5, and of which there are four all identical in the complete seat assembly, comprises a screw 54 having a head 55 welded to the upper surface of base 36 and a cylindrical shank 56 extending through a hole 57 in base 36 and terminating in threaded end portion 58. The axes of the shanks 56 of the two screws 54 on each side frame member are contained in a common vertical plane but are inclined toward each other so extensions of these axes meet at the center of the arc on which raceway 47 is formed. Loosely surrounding the straight shank is a flat-sided annular bearing element or disc 60, its upper and lower parallel smooth faces engaging smooth raceways 37 and 47 respectively. Disc 60 is made of a hard durable plastic material such as Delrin of adequate thickness to serve as a bearing member in the slide assembly. The discs 60 do not compress or deform under the loading stresses normally encountered. Thus four of these bearing members are located between seat frame 10 and the support beams, and there is no metal-to-metal sliding contact between the frame and beams.

Screw shanks 56 extend further downwardly through individual longitudinal rear and front aligned slots 64 and 65 formed in base 46 of beams 22 and 24. Each slot is of sufficient length determined by the desired adjusting distance, and the slots are all parallel. Adjacent and underneath base 46 another flat disc 66 of the same plastic material surrounds each shank 56. Discs 66 may be thinner than discs 60 because they carry less load.

The bearing assemblies 52 and consequently the frame 10 and beams 22 and 24 are held together by lock nuts 68 each having an integral flange 70 abutting discs 66. Each lock nut 68 has fixed therein a nylon or like plastic insert 72 which when screwed onto the threaded section 60 of weld screw 54 is cut by the thread of the screw thus forming a thread on the insert. Due to the elastic properties of nylon insert 72, nut 68 will be tightly locked in any position of rotation and it can be adjusted to the optimum position for providing that virtually no rattling will occur in the assembly. Vibrations of the vehicle body during travel will not loosen the nuts. Any possible wear on the plastic bearing discs 60 and 66 during life can be taken up by adjusting lock nut 68 accordingly, so that any possible rattle or misalignment in the slide track assembly may be definitely eliminated. This feature provides a very important improvement because wear adjustment is not usually possible on conventional antifriction bearing seat tracks, thus making rattle and harsh operation an almost unavoidable by-product of such slides. Even the normal noise level apparent in antifriction sliding seat tracks caused by the metal-to-metal contact between the rolling bearings and race tracks will be completely eliminated by the present novel slide construction.

By means of the cooperating and aligned slots 64 and 65 and bearing assemblies 52 the entire rectangular seat frame 10 of FIGURE 1 and anything on it can be readily moved longitudinally in both directions as, for instance, between the extreme rear position shown in the drawings and an extreme forward position and disposed in any position between both extremes.

As the frame 10 slides longitudinally, forwardly or rearwardly in the vehicle, slots 64 and 65 being essentially parallel to the longitudinal centerline of the vehicle, bearing discs 60 travel easily, smoothly and noiselessly along the tracks 47, the undersides of discs 60 and the upper sides of discs 66 having sliding bearing engagement with the upper and lower curved parallel surfaces of bases 46 which are flat in transverse section as shown in FIGURES 3 and 4. Because of the curvature of the raceway 47 and the corelated inclination of the axes of the bearing assemblies 52, the bearings have no tendency to bind despite the close sliding fit between the discs 60 and 66 and the adjacent raceway surfaces. Also because of the curvature of the raceways 47 the rake of the seat changes gradually as it is moved longitudinally and assumes a more upright position as it is moved forwardly.

In some installations the screw could be fixed to beams 22 and 24 and the slots formed in the seat frame, essentially the reverse equivalent of that above described, but the disclosed arrangement is preferred.

The entire weight of the seat cushions, back and occupants of the seats is borne by the low friction material discs 60 which are adequate to sustain such and which slide smoothly to a new location on the tracks even when loaded. To lock the seat frame 10 in the desired position of adjustment a lock mechanism has been provided which is composed mainly of two triangular-shaped locking latches 74 and 76 which are identical except that the right hand locking latch 76 in FIGURE 1 is provided with an integral hand lever 73 available to the left hand of the operator to manipulate the locking mechanism. Locking latches 74 and 76 are pivotally mounted on beams 22 and 24 respectively, as by rivets 80 and 82 and beneath the flat bases 36 of the side frame members. The latches 74 and 76 are metal plates thinner than discs 60, and are provided with downwardly extending rear pawls 84 and 86 respectively which are adapted to be locked in any opposite pair of notches 88 provided on the inner outwardly extending side flanges 48 of both beams 22 and 24. Outwardly of the beams 22 and 24, the locking latches 74 and 76 are secured respectively to tension coil springs 90 and 92 which hold the pawls 84 and 86 in their respective notches 88. The anchored ends of coil springs 90 and 92 are secured as shown at 94 (FIGURE 2) to the sloping side walls 40 of side frame members 11 and 12. A flexible wire cable 96 interconnects both locking latches 74 and 76 in such fashion as to transmit corresponding lever motion from the right hand locking latch 76 to the left hand locking latch 74 and is slidably supported intermediate its ends in a screw hook 98 adjustably mounted in the rear wall of front crossrail 16.

A coil spring 100 (FIGURE 2) of sufficient length and strength is secured at the rear as at 102 to either frame member 11 or 12, and at the front to beam 22 or 24. This tends to pull the whole seat frame 10 forwardly. Rearward movement of the seat frame places spring 100 under tension hereby storing energy to assist the forward movement of the seat frame, which is usually a little more difficult.

During installation of this novel sliding seat track it is advisable to provide the raceways adjacent the slots 64 and 65 of both beams 22 and 24 with a slight film of lubricant.

Thus, there has been provided a very simple, compact sliding seat assembly, which has definite economic advantages achieved by the integral track and seat frame structure which also results in a substantial savings in weight which is important in vehicle manufacture. Furthermore labor and time is saved in the assembly plant due to the complete seat assembly being put together prior to being bolted to the vehicle floor.

Further definite advantages over prior art devices are that no separate raceways are used, and in fact there is only one effective raceway which is integral with the support. The bearings which are made of durable self-lubricating plastic material are stationary on the seat frame and slide only along the support tracks. The only possible friction areas are between the plastic bearing discs 60 and the smooth metal surface of the beams. Wear on the moving parts is negligible and can be taken up by a unique lock nut which holds the bearing assemblies and frame and support together, this being another important improvement over conventional sliding seats which incorporate rolling bearings that are difficult to locate in such assemblies.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle seat assembly comprising support means adapted to be secured to the floor of a vehicle, a seat frame adapted to mount seat cushions, means providing longitudinal slide bearing engagement between said frame and support means embodying a plurality of bearing members of hard smooth low friction substantially incompressible plastic material constituting the entire load bearing structure between said frame and said support means interposed therebetween, said means also maintaining said seat frame in operative association with said support means, means for adjustably varying the bearing pressure between said bearing members and the associated surfaces of said frame and support means, and means for locking the seat frame in adjusted position on said support means.

2. In a vehicle seat assembly, support means comprising parallel beams adapted to be secured to the floor of a vehicle, seat frame means adapted to be mounted on said support means and comprising a rigid rectangular frame, spaced projections extending downwardly from each side of one of said means through slots extending longitudinally of the other of said means, substantially incompressible bearing members of hard smooth durable plastic material surrounding said projections and slidably frictionally engaging opposite sides of said other means at said slots, and means for adjusting and maintaining the degree of sliding friction between said bearing members and said other means.

3. In the assembly defined in claim 2, said projections being bolts welded at their heads to said one means, having shanks extending slidably through said slots, and threaded to receive adjustable members comprising said last named means.

4. In a seat assembly, a longitudinal support beam having a base provided with at least one longitudinally extending slot, a seat frame having a base portion extending above and along said beam, a member rigidly secured to said seat frame base and projecting slidably through said slot, an annular flat sided element of hard plastic material surrounding said member and disposed between said bases and having smooth sliding engagement with the upper surface of said beam base, a second hard plastic annular element surrounding said member below the slot and having smooth sliding engagement with the underside of said beam base, said elements being of substantially incompressible material, a threaded section on said member below said slot, and a lock nut mounted on said threaded section for urging said elements into predetermined frictional engagement with said beam base.

5. In the assembly defined in claim 4, said first named annular element being relatively thick and capable of bearing normal seat loads without appreciable deformation, and said second annular element being thinner.

6. In the assembly defined in claim 4, an insert sleeve of tough plastic interposed between said lock nut and the threaded section of said member.

References Cited in the file of this patent

UNITED STATES PATENTS

| | | |
|---|---|---|
| 2,267,043 | Premo | Dec. 23, 1941 |
| 2,636,545 | Johnson | Apr. 28, 1953 |
| 2,886,095 | Heyl | May 12, 1959 |